(12) United States Patent
Nakamura et al.

(10) Patent No.: US 10,087,279 B2
(45) Date of Patent: Oct. 2, 2018

(54) POLYOL COMPOSITION

(71) Applicant: NIPPON SODA CO., LTD., Tokyo (JP)

(72) Inventors: Mitsuhiro Nakamura, Chiba (JP); Shinichi Kimizuka, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 244 days.

(21) Appl. No.: 15/028,307

(22) PCT Filed: Oct. 21, 2014

(86) PCT No.: PCT/JP2014/077952
§ 371 (c)(1),
(2) Date: Apr. 8, 2016

(87) PCT Pub. No.: WO2015/060302
PCT Pub. Date: Apr. 30, 2015

(65) Prior Publication Data
US 2016/0264713 A1  Sep. 15, 2016

(30) Foreign Application Priority Data
Oct. 24, 2013  (JP) ................ 2013-220784

(51) Int. Cl.
| | |
|---|---|
| *C08G 18/62* | (2006.01) |
| *C08G 18/10* | (2006.01) |
| *C08G 63/82* | (2006.01) |
| *C08G 18/69* | (2006.01) |
| *C08G 18/76* | (2006.01) |
| *C08G 18/42* | (2006.01) |
| *C08F 8/14* | (2006.01) |

(52) U.S. Cl.
CPC ............ *C08G 18/6208* (2013.01); *C08F 8/14* (2013.01); *C08G 18/10* (2013.01); *C08G 18/4277* (2013.01); *C08G 18/69* (2013.01); *C08G 18/7621* (2013.01); *C08G 63/823* (2013.01)

(58) Field of Classification Search
CPC ............ C08G 18/6204; C08G 18/6208; C08G 18/4277; C08K 5/521; C08K 5/523
USPC .......................................................... 525/460
See application file for complete search history.

(56) References Cited

U.S. PATENT DOCUMENTS

| | | | | |
|---|---|---|---|---|
| 2,914,556 | A | | 11/1959 | Hostettler et al. |
| 4,483,974 | A | * | 11/1984 | Grogler ................ C07C 263/18 264/302 |
| 4,853,051 | A | * | 8/1989 | Bennett ................... C06B 45/10 149/19.4 |
| 5,512,651 | A | * | 4/1996 | Carlson ............... C08G 18/6204 252/62.54 |
| 2006/0014843 | A1 | * | 1/2006 | Tanaka ................... C08G 18/14 521/99 |
| 2006/0035989 | A1 | * | 2/2006 | Tokuyasu ........... C08G 18/4829 521/99 |
| 2015/0218306 | A1 | | 8/2015 | Navarro et al. | |

FOREIGN PATENT DOCUMENTS

| | | |
|---|---|---|
| CA | 1320606 C | 7/1993 |
| CN | 101993529 A | 3/2011 |
| CN | 103172816 A | 6/2013 |
| EP | 0266973 A2 | 5/1988 |
| GB | 671077 A | 4/1952 |
| JP | 35-000497 B | 1/1960 |
| JP | S60-23418 A | 2/1985 |
| JP | S63-128017 A | 5/1988 |
| JP | H05-239201 A | 9/1993 |
| JP | H05-262858 A | 10/1993 |
| JP | H-06-256461 A | 9/1994 |
| JP | H09-507255 A | 7/1997 |
| JP | H10-259295 A | 9/1998 |
| JP | 2001-192421 A | 7/2001 |
| JP | 2004-307583 A | 11/2004 |
| JP | 2012-017356 A | 1/2012 |
| JP | 2013-513008 A | 4/2013 |
| KR | 900000163 B1 | 1/1990 |
| KR | 10-2011-0099216 A | 9/2011 |
| WO | 95/18170 A1 | 7/1995 |
| WO | 2011/018161 A1 | 2/2011 |

OTHER PUBLICATIONS

Makiguchi et al. Diphenyl Phosphate as an Efficient Cationic Organocatalyst for Controlled/Living Ring-Opening Polymerization of δ-Valerolactone and ε-Caprolactone. Macromolecules 2011, 44, 1999-2005. (Year: 2011).*
Jan. 20, 2015 Search Report issued in International Patent Application No. PCT/JP2014/077952.
Jul. 20, 2015 Office Action issued in Taiwanese Patent Application No. 103136424.
Makiguchi, Kosuke et al., "Diphenyl Phosphate as an Efficient Cationic Organocatalyst for Controlled/Living Ring-Opening Polymerization of -Valerolactone and -Caprolactone", Macromolecules, 2011, vol. 44, pp. 1999-2005.
Feb. 6, 2017 Office Action issued in Korean Patent Application No. 10-2016-7007484.

(Continued)

*Primary Examiner* — Michael M Dollinger
(74) *Attorney, Agent, or Firm* — Oliff PLC

(57) ABSTRACT

The present invention provides a polyol composition including a polyol having a polyester chain, wherein the polyol composition substantially contains no metal-base polymerization catalyst and an amount of phosphorus element derived from a polymerization catalyst is 1 to 1000 ppm. Furthermore, a method for producing a polyol composition is provided, including reacting a compound having an active hydrogen with a compound having at least one selected from the group consisting of carboxyl group, ester group and acid halide group in the presence of 0.0001-0.05 parts by mol of a phosphorus compound with respect to 1 part by mol of the active hydrogen without using a metal-based polymerization catalyst.

10 Claims, No Drawings

(56) References Cited

OTHER PUBLICATIONS

Sep. 27, 2016 Office Action issued in Japanese Patent Application No. 2015-543865.
May 9, 2017 Search Report issued in European Patent Application No. 14856067.5.
Feb. 28, 2018 Notice of Allowance issued in Korean Patent Application No. 10-2016-7007484.

* cited by examiner

POLYOL COMPOSITION

TECHNICAL FIELD

The present invention relates to a polyol composition capable of being used for producing a polyurethane or the like having excellent storage stability and physical properties and a method for producing the polyol composition without performing a polymerization catalyst-removing operation.

Priority is claimed on Japanese Patent Application No. 2013-220784, filed Oct. 24, 2013, the content of which is incorporated herein by reference.

BACKGROUND ART

A polyol is a raw material compound of polyurethanes, polyesters or the like. Among the polyols, since the polyester polyols have excellent physical properties, they have been used as elastomer parts of a raw material for manufacturing a roll for a printing device, a belt for conveyance, a blade for a copying machine; a raw material of urethane fibers or the like.

As the polyester polyol-related technology, Patent Document 1 discloses a composition obtained by adding 0.05 to 1000 ppm of phosphorus compound such as a trialkyl phosphate or the like to a polyester polyol. Patent Document 2 discloses a method for producing a polyester polyol including adding water to a polyester polyol which is produced using a titanium-based catalyst and heating, followed by adding a phosphorus compound having a specific structure to the resulting mixture in an amount such that the amount of phosphorus atoms is 0.01 to 2 mol with respect to 1 mol of titanium atoms. Patent Document 3 discloses a method for producing an ester-based polymeric polyol composition in which a urethanization reaction is restrained including adding a phosphorus compound having a specific structure to an ester-based polymeric polyol produced using a titanium-based esterification catalyst in an amount such that the amount of phosphorus atoms is 1 mol with respect to 1 mol of titanium atoms.

Patent Document 4 discloses that a polyester is produced by reacting an aliphatic dibasic acid with an aliphatic di(alcohol) in an aromatic compound solvent in the presence of a protic strong acid catalyst such as phosphoric acid. In this process, the used amount of the protic strong acid catalyst is preferably 0.01 to 5% by weight of the reactants.

Patent Document 5 discloses a method for preparing a copolymer from at least one cyclic monomer selected from among: a lactone, lactam, carbonate, or lactide, and from among a glycolide, oxazoline, epoxide, or cyclosiloxane in the presence of a phophorous-substituted compound such as diphenyl phosphate, (R)-3,3'-bis[3,5-bis(trifluoromethyl) phenyl]-1,1'-binaphthyl-2,2'-diyl hydrogenphosphate or the like. The phosphorus-substituted compound is used in an amount of 1 to 3 mol with respect to 1 mol of a hydroxyl group or thiol group in a polymerization initiator such as 3-phenyl-1-propanol, n-pentanol or the like.

Furthermore, Non-Patent Document 1 discloses a polyester polyol produced by ring-opening polymerization of ε-caprolactone or δ-valerolactone using 1 mol of diphenyl phosphorate catalyst with respect to 1 mol of a polymerization initiator such as 3-phenyl-1-propanol or the like.

PRIOR ART LITERATURE

Patent Documents

Patent document 1: Japanese Unexamined Patent Application Publication No. Sho 63-128017
Patent document 2: Japanese Unexamined Patent Application Publication No. Hei 05-239201
Patent document 3: Japanese Unexamined Patent Application Publication No. Hei 10-259295
Patent document 4: Japanese Unexamined Patent Application Publication No. Hei 06-256461
Patent document 5: Japanese Unexamined Patent Application Publication (Translation of PCT Application) No. 2013-513008

Non-Patent Document

Non-patent document 1: Macromolecules 2011, 44, 1999-2005

DISCLOSURE OF INVENTION

Problems to be Solved by the Invention

A polymer with remaining polymerization catalyst therein such as a phosphorus compound causes side reaction during the urethanization or lowers the storage stability or physical properties of the obtained polyurethane. In order to remove the polymerization catalyst such as a phosphorus compound or the like, removing operations such as deposition, filtration, distillation or the like are necessarily performed.

The objective of the present invention is to provide a polyol capable of being used for producing a polyurethane or the like having excellent storage stability and physical properties and a method for producing the polyol composition without performing a polymerization catalyst-removing operation.

Means for Solving the Problems

As a result of studies in order to solve the above problems, the inventors of the present invention have completed the present invention which includes the following aspects.
[1] A method for producing a polyol composition, comprising
  reacting a compound having an active hydrogen with a compound having at least one selected from the group consisting of a carboxyl group, ester group and acid halide group in the presence of 0.0001-0.05 parts by mol of a phosphorus compound with respect to 1 part by mol of the active hydrogen without using a metal-based polymerization catalyst.
[2] The method for producing a polyol composition according to [1], wherein
  the compound having an active hydrogen is a compound represented by formula (3),

[Chemical formula 1]

$$T\text{O}-X^1-\text{OH} \qquad (3)$$

in formula (3), $X^1$ represents a polymer chain including a repeating unit derived from a conjugated diene, and T represents a hydrogen atom or an organic group substitutable with a hydrogen atom.
[3] The method for producing a polyol composition according to [2], wherein
  the conjugated diene is butadiene.
[4] The method for producing a polyol composition according to any one of [1] to [3], wherein
  the compound having at least one selected from the group consisting of a carboxyl group, ester group and acid halide group is a cyclic ester compound.

[5] The method for producing a polyol composition according to [4], wherein
the cyclic ester compound is a compound represented by formula (1),

[Chemical formula 2]

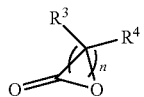

(1)

in formula (1), $R^3$ and $R^4$ each independently represents a hydrogen atom or an alkyl group, n represents an integer of 2 to 7, and $R^3$s or $R^4$s may be the same or different from each other.
[6] The method for producing a polyol composition according to [4], wherein
the cyclic ester compound is at least one selected from the group consisting of ε-caprolactone, γ-butyrolactone and δ-valerolactone.
[7] The method for producing a polyol composition according to any one of [1] to [6], wherein
the phosphorus compound is a compound represented by formula (2),

[Chemical formula 3]

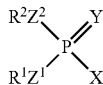

(2)

in formula (2), X represents a hydroxyl group or a mercapto group, Y represents an oxygen atom or a sulfur atom, $R^1$ and $R^2$ each independently represents a hydrogen atom or a substituted or unsubstituted C1-20 hydrocarbon group, $R^1$ and $R^2$ may bond directly or via an atom or a functional group having two or more bonding hands to form a ring together with $Z^1$, $Z^2$ and P, $Z^1$ and $Z^2$ each independently represents an oxygen atom or a substituted nitrogen atom.
[8] A polyol composition comprising a polyol having a polyester chain, wherein the polyol composition substantially contains no metal-based polymerization catalyst, and an amount of a phosphorus element derived from a polymerization catalyst is 1 to 1000 ppm.
[9] The polyol composition according to [8], wherein the polyol further has a polyconjugated diene chain.
[10] The polyol composition according to [9], wherein the polyconjugated diene chain is a polybutandiene chain.
[11] A urethane prepolymer obtained by reacting any one of the polyol composition defined in [8] to [10] with an organic polyisocyanate.
[12] A polyurethane obtained by reacting any one of the polyol composition defined in [8] to [10] with an organic polyisocyanate.

Effects of the Invention

According to the polyol composition of the present invention, excessive side reaction may be suppressed during the urethanization using an isocyanate or the like. Furthermore, according to the method for producing a polyol composition, the polyol composition of the present invention may be produced without performing a polymerization catalyst-removing operation. Furthermore, according to the polyol composition of the present invention, a polyurethane excellent in storage stability and mechanical properties may be produced.

BEST MODE FOR CARRYING OUT THE INVENTION

A polyol composition according to one embodiment of the present invention is a composition including a polyol. The polyol has a polyester chain, preferably a polycongugated diene chain and a polyester chain, more preferably a polybutadiene chain and a polyester chain. In the polyol, although a proportion of the polyester is not particularly limited, it is preferably 30% or more by mass. A mass ratio of the polyconjugated diene chain to the polyester chain is preferably 10/90 to 90/10. The polyol may include other polymer chains such as a polyether chain, a polyacrylonitrile chain, a polystyrene chain, an acrylonitrile-styrene copolymer chain or the like according to need.

In addition, the polyol preferably has a structure having a hydroxyl group at both terminals. The polyol may have a functional group such as a double bond, an epoxy group, an aldehyde group, an alkoxy group or the like other than hydroxyl group in one molecule.

The polyester chain may be obtained by polycondensation of a compound having plural carboxyl groups, such as a polyvalent carboxylic acid, a polyvalent carboxylic acid ester, a polyvalent carboxylic acid halide, a polyvalent carboxylic acid anhydride or the like with a compound having plural active hydrogens such as a polyhydric alcohol or the like; or obtained by polycondensation of a compound having carboxyl groups and a hydroxyl group in one molecule (polycondensation polyester), or obtained by ring-opening polymerization of a cyclic ester compound such as ε-caprolactone, δ-valerolactone or the like using an initiator including an active hydrogen (ring-opening polymerized polyesters). In addition, the "carboxyl groups" include a carboxyl group, an ester group, an acid halide group and an acid anhydride group.

As the compound having plural carboxyl groups which is used for producing the polycondensation polyester, a compound generally used for producing polyesters may be used. For instance, a polyvalent carboxylic acid such as a succinic acid, glutaric acid, adipic acid, pimelic acid, fumaric acid, phthalic acid or the like; a polyvalent carboxylic acid partial ester such as a monomethyl adipic acid, monomethyl fumaric acid or the like; a polyvalent carboxylic acid polyvalent ester such as a dimethyl adipic acid, dimethyl fumaric acid, dimethyl phthalic acid or the like; a polyvalent carboxylic acid halide such as adipic acid methyl ester chloride, adipic acid dichloride or the like; a polyvalent carboxylic acid anhydride such as phthalic anhydride, maleic anhydride or the like; or the like may be exemplified.

As the compound having both carboxyl groups and a hydroxyl group in one molecule which is used for producing the polycondensation polyester, a hydroxy carboxylic acid such as a glycolic acid, lactic acid, 4-hydroxybutanoic acid or the like; a hydroxyl carboxylic acid ester such as a glycolic acid ethyl, lactic acid ethyl or the like may be exemplified.

The cyclic ester compound used for producing the ring-opening polymerization polyesters is a compound that is generally used for producing polyesters. As the cyclic ester compound, a lactane; a lactide such as 1,4-dioxane-2,5- dione, 3,6-dimethyl-1,4-dioxane-2,5-dione, 1,6-dioxane-2,7-dione or the like may be exemplified. Among these examples, a compound represented by formula (1) is preferable.

[Chemical formula 4]

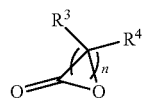

(1)

In formula (1), $R^3$ and $R^4$ each independently represents a hydrogen atom or an alkyl group. As the alkyl group, a methyl group, ethyl group, n-propyl group, isopropyl group, n-butyl group, isobutyl group, s-butyl group, t-butyl group or the like may be exemplified.

In formula (1), n represents an integer of 2 to 7, and $R^3$s or $R^4$s may be the same or different from each other.

As the specific examples of the compound represented by formula (1), γ-butyrolactone, γ-laurolactone, γ-butyrolactone, η-caprylolactone, β-methyl-δ-valerolactone, ε-caprolactone, δ-valerolactone, α-methyl-ε-caprolactone, β-methyl-ε-caprolactone, γ-methyl-ε-caprolactone, β,δ-dimethyl-ε-caprolactone or the like may be exemplified. Among the examples, ε-caprolactone, γ-butyrolactone, and δ-valerolactone are preferable. These cyclic ester compounds may be used alone or used by combination of two or more thereof.

The compound having an active hydrogen used for producing a polycondensed polyester is slightly different from the compound having an active hydrogen used for producing a ring-opening polymerization polyester. In addition, the "active hydrogen" indicates a hydrogen atom capable of providing a hydrogen radical or proton to radicals or anions. As the active hydrogen, a hydrogen atom in a hydroxyl group (OH), a hydrogen atom in an amino group ($NH_3$, $NH_2$, NH), a hydrogen atom in a mercapto group (SH), a hydrogen atom in a carboxyl group (COOH) or the like may be exemplified. Among these examples, the hydrogen atom in a hydroxyl group is preferable.

The compound having an active hydrogen used for producing the polycondensation polyester is a polyhydric alcohol. In the polyhydric alcohol, as long as it has two or more hydroxyl group, other parts of the molecular structure are not particularly limited. That is, a compound having at least two hydroxyl groups and other functional groups may be used as the polyhydric alcohol.

As the polyhydric alcohol, one having two hydroxyl groups such as ethylene glycol, diethylene glycol, triethylene glycol, 1,2-propylene glycol, dipropylene glycol, 1,3-propane diol, polyethylene glycol, polypropylene glycol, polybutylene glycol, polytetramethylene glycol, 1,2-butane diol, 1,3-butane diol, 1,4-butane diol, neopentyl glycol, 1,5-pentane diol, 1,6-hexane diol, 1,10-decane diol, 1,12-dodecane diol, spiroglycol, 1,4-cyclohexane dimethanol, 2,2,4,4-trimethyl pentane diol, 3-methyl-1,5-pentane diol, cyclohexane diol, 4,4'-methylene biscyclohexanol, 4,4'-isopropylidene bis-cyclohexanol, 2-(4-hydroxymethyl phenyl) ethanol or the like; one having three hydroxyl groups such as glycerol, trimethylolethane, trimethylolpropane, trimethyloloctane, 1,2,6-hexane triol, triethanolamine, triisopropanolamine, triazine-2,4,6-triol or the like; one having four hydroxyl group such as erythritol, pentaerythritol, N,N,N'',N'''-tetrakis(2-hydroxyethyl)tetraethylene diamine or the like; a saccharide alcohol such as sorbitol or the like; tris(2-hydroxyethyl)cyanurate; an aromatic polyhydric alcohols such as xylene diol, bisphenols, hydrogenated bisphenols or the like; a branched polyalkylene carbonate diol such as poly(2-methyl-1,3-propylene adipate)diol, poly(1,4-butylene adipate)diol or the like; a polyhydroxylated polyisoprene, a polyhydroxylated polybutadiene, a polyhydroxylated polyisobutylene; a polyhydroxyalkanoate such as a polylactide having a terminal hydroxyl group, poly(3-hydroxybutyrate), poly(3-hydroxyvalerate) or the like; modified or unmodified saccharides or oligosaccharides (monosaccharide or oligosaccharide) such as starch, cellulose, chitin, chitosan, sucrose, dextran or the like; poly(hydroxyalkyl(meth)acrylate)s such as poly(4-hydroxybutyl methacrylate), poly(2-hydroxyethyl acrylate), poly(2-hydroxyethyl methacrylate), poly(methyl methacrylate/2-hydroxyethyl methacrylate) copolymer or the like; poly(4-hydroxystyrene), poly(4-hydroxy-α-methyl styrene), poly(4-hydroxystyrene/styrene) copolymer, (4-hydroxystyrene/methyl methacrylate) copolymer or the like may be exemplified.

In the compound having an active hydrogen used for producing a ring-opening polymerization polyester, as long as it has at least one active hydrogen, other parts of the molecule structure are not particularly limited. For instance, the aforementioned polyhydric alcohol; compounds having at least one active hydrogen and a functional group capable of introducing a hydroxyl group or capable of being converted into a hydroxyl group, or the like may be exemplified. As the compound having at least one active hydrogen and a functional group capable of introducing hydroxyl group or capable of being converted into a hydroxyl group, for instance, 2-methoxyethanol, 2-acetoxyethanol, monoglycidyl bisphenol, 2-methoxyethane thiol, 2-acetoxyethylamine, allyl alcohol, methoxypolyoxyethylene glycol, acetoxypolyoxypropylene glycol, trimethyl silyloxypolyoxybutylene glycol, ethoxypolytetramethylene glycol or the like may be exemplified. The functional group capable of introducing hydroxyl group or capable of being converted into a hydroxyl group may introduce a hydroxyl group or may be converted into a hydroxyl group after completion of the ring-opening polymerization reaction. In such a manner, it is possible to form a structure having a hydroxyl group at the terminal of the polymer chain.

In the present invention, as the compound having an active hydrogen used for production of a polyester chain, a polyhydric alcohol is preferable, and a hydroxylated conjugated diene polymer such as a hydroxylated polyisoprene, hydroxylated polybutadiene or the like, hydroxylated alkylenes such as a hydroxylated polyisobutylene or the like is more preferable, and a hydroxylated conjugated diene polymer is particularly preferable. In addition, a molecular weight of the hydroxylated alkylenes or the hydroxylated conjugated polymer is preferably 500 to 20000, and more preferably 1000 to 7000.

As the hydroxylated conjugated diene polymer which is one of the compounds having an active hydrogen, a compound represented by formula (3) is preferable.

[Chemical formula 5]

TO-$X^1$—OH (3)

In formula (3), $X^1$ represents a polymer chain including a repeating unit derived from a conjugated diene.

As the conjugated diene, 1,3-butadiene, isoprene, 1,3-pentadiene or the like may be exemplified. Among these examples, 1,3-butadiene is preferable. Examples of the repeating unit derived from a conjugated diene include a repeating unit obtained by 1,4-addition polymerization (hereinafter, may be referred to as 1,4-structure, and this 1,4-structure includes trans-isomer and cis-isomer) and a repeating unit obtained by 1,2-addition polymerization (hereinafter, may be referred to as 1,2-structure) according to the reaction condition, and both of them are acceptable. Although an amount of 1,2-structure is not particularly limited, 50% by mol or more is preferable, 70% by mol or more is more preferable, and 80% by mol or more is particularly preferable with respect to the total amount of the repeating units. The repeating unit derived from a conjugated diene includes a double bond. The double bond may be converted to a single bond by a hydrogenation reaction. In addition, it may be acceptable that hydroxysilanes be added to the double bond, or the double bond be oxidized and converted to an epoxy group, or a carboxylic acid or the like be added to the double bond to convert the double bond to an ester group or the like, or mercapto alcohols be added the double bond.

In formula (3), T represents a hydrogen atom or an organic group substitutable with a hydrogen atom, and preferably represents a hydrogen atom. As the organic group, an alkyl group such as a methyl group, ethyl group or the like; an alkenyl group such as an allyl group or the like; an alkynyl group such as a propargyl group or the like; an aryl group such as a phenyl group or the like, an acyl group such as an acetyl group or the like; a silyl group such as a trimethyl silyl group or the like, or the like may be exemplified. The organic group may be replaced with a hydrogen atom after completion of the ring-opening polymerization reaction, thereby introducing a hydroxyl group to the polymer chain terminals.

As the compound represented by formula (3), commercial products such as NISSO-PB (registered trade mark) G-1000 (manufactured by Nippon Soda Co., Ltd.), NISSO-PB (registered trade mark) G-2000 (manufactured by Nippon Soda Co., Ltd.), NISSO-PB (registered trade mark) G-3000 (manufactured by Nippon Soda Co., Ltd.), NISSO-PB (registered trade mark) GI-1000 (manufactured by Nippon Soda Co., Ltd.), NISSO-PB (registered trade mark) GI-2000 (manufactured by Nippon Soda Co., Ltd.), NISSO-PB (registered trade mark) GI-3000 (manufactured by Nippon Soda Co., Ltd.), Poly bd R45HT (manufactured by Idemitsu Kosan Co., Ltd.) or the like may be used. These products may be used alone or used by combination of two or more thereof.

By using the compound represented by formula (3) as the compound having an active hydrogen, it is possible to obtain a polyol having a polyester chain and a polyconjugated diene chain, preferably a polyester chain and a polybutadiene chain.

In the polymerization for producing a polyester chain, a phosphorus compound is used as a polymerization catalyst. In the present invention, an amount of the phosphorus compound existing in the reaction system during the polymerization is 0.0001 to 0.05 parts by mol, preferably 0.001 to 0.05 parts by mol, more preferably 0.001 to 0.01 parts by mol with respect to 1 part by mol of the compound having an active hydrogen atom. Setting the amount of the phosphorus compound within the aforementioned range makes it possible to reduce the amount of phosphorus element contained in the polyol composition.

Although the amount of the phosphorus compound is as described above, the amount may also be set to a range of 0.01 to 1.00 parts by mass with respect to 100 parts by weight of the compound having carboxyl groups.

If the amount of the phosphorus compound is too small, the reaction rate will be reduced, thereby requiring a long time to complete the reaction. In order to overcome this problem, if the reaction is performed at a high temperature, side reaction will occur, thereby lowering the yield and purity of the product. If the amount of the phosphorus compound is too large, a post-process using the product or a product obtained therein will be affected by various factors. As a result, a targeted polymer cannot be obtained or the obtained polymer has inferior physical properties such as mechanical property, storage stability or the like.

The phosphorus compound used in the present invention is not particularly limited as long as it catalytically promotes the polymerization reaction. Specifically, phosphoric acid, a phosphoric acid monoester such as monophenyl phosphoric acid or the like; a phosphoric acid diester such as diphenyl phosphoric acid or the like; phosphorous acid, a phosphorous acid monoester such as monophenyl phosphorous acid or the like; hypophosphoric acid, a phosphonic acid such as methyl phosphonic acid or the like; a phosphonic acid monoester such as monophenyl methyl phosphonic acid or the like; a phosphinic acid such as dimethyl phosphinic acid or the like; a thio derivative thereof (in which some or all oxygen atoms are converted to sulfur atoms); an amide derivative thereof (in which some or all oxygen atoms are converted to nitrogen atoms and the nitrogen atoms are substituted with hydrogen atoms or other organic groups); or the like may be exemplified.

Among these examples, a compound represented by formula (2) is preferable.

[Chemical formula 6]

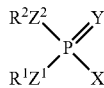

(2)

In formula (2), X represents a hydroxyl group or a mercapto group, Y represents an oxygen atom or a sulfur atom, $R^1$ and $R^2$ each independently represents a hydrogen atom or a substituted or unsubstituted C1-20 hydrocarbon group, preferably a hydrogen atom or a C1-20 alkyl group.

As the C1-20 hydrocarbon group, a methyl group, ethyl group, n-propyl group, isopropyl group, n-butyl group, s-butyl group, t-butyl group, isobutyl group, n-pentyl group, s-pentyl group, t-pentyl group, pentyl group, neopentyl group, n-hexyl group, n-heptyl group, n-octyl group, n-decyl group, n-undecyl group, n-dodecyl group, n-tetradecyl group, n-octadecyl group, phenyl group, naphthyl group, cyclopropyl group, cyclohexyl group or the like may be exemplified. As a substituent with which the hydrocarbon group may be substituted, a halogeno group, alkoxy group, alkyl thio group, mono or dialkyl amino group, aryl group, heterocyclic group, acyl group or the like may be exemplified. As specific examples of the substituted C1-20 hydrocarbon group, a trifluoromethyl group, 2-chloroethyl group, 1-ethoxyethyl group, 2-methoxyethyl group, benzyl group, 2-pyridyl methyl group, methoxymethyl group, methyl thiomethyl group, dimethyl aminomethyl group, acetyl methyl group or the like may be exemplified.

$R^1$ and $R^2$ may bond directly or via an atom or a functional group having two or more bonding hands to form a ring together with $Z^1$, $Z^2$ and P.

$Z^1$ and $Z^2$ each independently represents an oxygen atom or a substituted nitrogen atom. As the substituted nitrogen atom, a (4-methyl phenyl sulfonyl)amino group, (4-trifluoromethyl sulfonyl)amino group, (2-naphthyl sulfonyl)amino group or the like may be exemplified.

As the compound represented by formula (2), the following compounds or the like may be exemplified.

[Chemical formula 7]

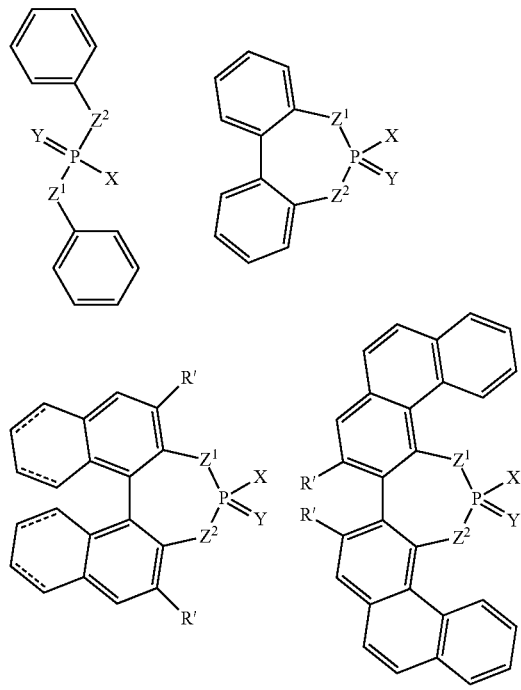

R' represents a hydrogen atom, phenyl group, 3,6-diphenyl phenyl group, 2,4,6-trimethyl phenyl group, 3,4,5-trimethyl phenyl group, 2,4,6-triisopropyl phenyl group, 3,5-bis (trifluoromethyl)phenyl group, 4-t-butyl, 2,6-diisopropyl phenyl group, 4-t-butyl phenyl group, 4-methoxyphenyl group, 4-nitrophenyl group, triphenyl silyl group, diphenyl-t-butyl silyl group, 4-biphenyl group, 1-naphthyl group, 2-naphthyl group, 9-anthryl group, 9-phenanthryl.

As specific examples of the compound represented by formula (2), phosphoric acid dimethyl, phosphoric acid diethyl, phosphoric acid diisopropyl, phosphoric acid di-n-butyl, phosphoric acid diisobutyl, phosphoric acid di-n-ethyl hexyl, phosphoric acid dilauryl, phosphoric acid dioleyl, phosphoric acid distearyl, phosphoric acid diphenyl, phosphoric acid monomethyl, phosphoric acid monoethyl, phosphoric acid monoisopropyl, phosphoric acid mono-n-butyl, phosphoric acid monoisobutyl, phosphoric acid mono-n-ethyl hexyl, phosphoric acid monolauryl, phosphoric acid monooleyl, phosphoric acid monostearyl, phosphoric acid monophenyl, 3,3'-bis[3,5-bis(trifluoromethyl)phenyl]-1,1'-binaphthyl-2,2'-diyl phosphate, thiophosphate, methyl thiophosphoric acid, ethyl thiophosphoric acid, dimethyl thiophosphoric acid, diethyl thiophosphoric acid, N,N'-bis [(trifluoromethyl)methyl]diphenyl phospholoamide or the like may be exemplified. Among these examples, phosphoric acid diphenyl is particularly preferable. These compounds may be used alone or used by mixing two or more thereof.

In the polyol composition according to one embodiment of the present invention, an amount of phosphorus element is 1 to 1000 ppm, preferably 1 to 100 ppm, more preferably 1 to 50 ppm.

The amount of phosphorus element may be measured by Inductively Coupled Plasma Atomic Emission Spectroscopy (ICP-AES). Polyurethanes obtained by reacting a polyol composition including a large amount of phosphorus element with a polyisocyanate have a tendency that the yield or purity thereof is low and the physical properties thereof are inferior. A production process of a polyol composition including a small amount of phosphorus element makes the reaction rate low and causes problems in productivity. In addition, if a high temperature condition is applied in order to increase the reaction rate, by-products will be increased.

In the polyol composition according to one embodiment of the present invention, the method for producing thereof is not particularly limited. In the present invention, a production method including reacting the aforementioned compound having an active hydrogen with a compound having at least one selected from the group consisting of a carboxyl group, ester group and acid halide group in the presence of a phosphorus compound without using a metal-based polymerization catalyst is preferable. The compound having an active hydrogen and the phosphorus compound are as described above. In addition, the compound having at least one selected from the group consisting of a carboxyl group, ester group and acid halide group is the aforementioned compounds having plural number of carboxyl groups and the cyclic ester compounds. Although metal-based polymerization catalysts such as a titanium-based catalyst are generally used in a process for producing polyesters, in the present invention, the metal-based polymerization catalyst is not used.

The reaction may be performed by any one of a bulk polymerization method, a solution polymerization method and the like. In the reaction, although the temperature of the reaction raw materials may be raised until the viscosity thereof allows the reaction raw materials to be sufficiently stirred, it is preferable that the temperature be raised so that vaporization of the reaction raw materials or decomposition of the catalyst is prevented. The temperature during the reaction is preferably 50° C. to 200° C., more preferably 80° C. to 150° C.

The reaction time may be suitably selected depending on the reaction scale, the reaction temperature, the kind or the mass ratio of the reaction raw materials, the kind or the used amount of the catalyst, or the like, and it is preferably 3 to 26 hours.

In addition, the reaction may be conducted in a continuous flow manner or a batch manner. The method for adding the compound having an active hydrogen and the compound having carboxyl groups is not particularly limited. For instance, the compound having an active hydrogen and the compound having carboxyl groups may be mixed and then put into a reactor all at once, continuously, or discontinuously; or the compound having an active hydrogen and the compound having carboxyl groups may be separately put into a reactor all at once, continuously, or discontinuously. In the case where multiple kinds of the compound having carboxyl groups were used, one kind of the compound having carboxyl groups may be put into a reactor all at once, followed by adding another kind of the compound thereto continuously or discontinuously.

In general, in the present invention, the reaction is completed just when the compound having carboxyl groups is not detected in the reaction solution. The quantification method of the compound having carboxyl groups is not particularly limited. For instance, a method for measuring the viscosity of the reaction solution, UV spectroscopy, infrared spectroscopy, near-infrared spectroscopy, nuclear magnetic resonance spectroscopy, gas chromatography, liquid chromatography, gel permeation chromatography or the like may be used for the quantification. Among these methods, gas chromatography or gel permeation chromatography is preferable.

Since the polyol composition obtained in the present invention includes a lesser amount of phosphorus element and includes substantially no metal-based catalyst, the reaction solution right after the completion of the reaction may be directly used to a post-process. In addition, the reaction solution right after the completion of the reaction may be vacuum-evaporated to remove volatile components, or may be treated by known purification methods to increase the purity.

The polyol composition of the present invention may preferably be used for a reaction obtaining a polycarbonate by reacting with phosgene or the like, a reaction obtaining a polyurethane by reacting with polyisocyanate, or the like.

The polyurethane of the present invention is obtained by reacting the polyol composition of the present invention with an organic polyisocyanate. In the reaction, additives such as a chain extender or the like may be added according to need. The reaction may be performed by, for instance, a prepolymer method or a one-shot method.

The prepolymer method is a method in which the polyol composition of the present invention and an organic polyisocyanate are reacted to obtain a urethane polymer having an isocyanate group at the terminal, followed by reacting the urethane polymer with a chain extender to obtain a polyurethane. The one-shot method is a method in which the polyol composition of the present invention, an organic polyisocyanate, and optionally a chain extender are put into a reactor all at once to react and obtain a polyurethane.

As long as the organic polyisocyanate used in the present invention is an organic compound having two or more isocyanate groups in one molecule, the structure thereof is not particularly limited, and specifically, 4,4'-diphenyl methane diisocyanate (MDI), polymeric MDI, 2,4-tolylene diisocyanate (2,4-TDI), 2,6-tolylene diisocyanate (2,6-TDI), hexamethylene diisocyanate (HDI), isophorone diisocyanate (IPDI), m- or p-phenylene diisocyanate, m-xylylene diisocyanate (XDI), p-xylylene diisocyanate, tetramethyl xylene diisocyanate, ethylene-1,2-diisocyanate, tetramethylene-1,4-diisocyanate, trimethyl hexamethylene diisocyanate, naphthalene diisocyanate, norbornane diisocyanate, cyclohexane diisocyanate, dicyclohexyl methane diisocyanate, triphenyl methane triisocyanate, lysine triisocyanate or the like may be exemplified. Among these examples, an organic diisocyanate is preferable. These polyisocyanates may be used alone or used by combination of two or more thereof.

Among the organic diisocyanates, the one in which two isocyanate groups are in a resonance relationship is preferable in terms of pot life length, good handling ability, mechanical strength of polyurethane or the like. As the organic diisocyanate in which two isocyanate groups are in a resonance relationship, a tolylene diisocyanate such as 2,4-tolylene diisocyanate (2,4-TDI), 2,6-tolylene diisocyanate (2,6-TDI) or the like may be exemplified. 2,4-TDI and 2,6-TDI may be used alone or used by combination thereof. The used ratio of 2,4-TID/2,6-TDI by mass is preferably 55/45 to 100/0, more preferably 65/35 to 100/0, particularly preferably 85/15 to 100/0.

Although an amount of the organic polyisocyanate used during the urethanization reaction is not particularly limited, a ratio of a molar number of the isocyanate group in the organic polyisocyanate to a molar number of the active hydrogen in the polyol composition (R ratio) is preferably set to 1 to 10, more preferably set to 2 to 5, particularly preferably set to 2.1 to 3.8.

As the chain extender used according to need in the present invention, a low-molecular-weight polyvalent hydric alcohol, a low-molecular-weight polyvalent amine or the like may be exemplified. Among the examples, a low-molecular-weight polyhydric alcohol is preferable.

As the low-molecular-weight polyhydric alcohol, an aliphatic diol such as ethylene glycol, diethylene glycol, triethylene glycol, propylene glycol, dipropylene glycol, tripropylene glycol, 1,3-propane diol, 2-methyl-1,3-propane diol, 2-methyl-2-propyl-1,3-propane diol, 2-butyl-2-ethyl-1,3-propane diol, 2-butyl-2-hexyl-1,3-propane diol, 1,2-butane diol, 1,3-butane diol, 1,4-butane diol, 2,3-butane diol, 1,5-pentane diol, 2-methyl-2,4-pentane diol, 3-methyl-1,5-pentane diol, 2,2,4-trimethyl-1,3-pentane diol, neopentyl glycol, 1,6-hexane diol, 2-ethyl-1,3-hexane diol, 2,5-dimethyl-2,5-hexane diol, 1,8-octane diol, 2-methyl-1,8-octane diol, 1,9-nonane diol or the like; an aliphatic triol such as trimethylolpropane, glycerol or the like; an alicyclic diol such as bishydroxymethyl cyclohexane or the like; an aromatic ring-containing diol such as xylylene glycol, dihydroxyethoxybenzene or the like; or the like may be exemplified. Among the examples, an aliphatic diol and an alicyclic diol are preferable, and an aliphatic diol is more preferable in terms of obtaining a polyurethane excellent in mechanic strength, water resistance and handling ability.

As the low-molecular-weight polyvalent amine, an aromatic diamine such as 2,4-tolylene diamine, 2,6-tolylene diamine, xylylene diamine, 4,4'-diphenyl methane diamine or the like; an aliphatic diamine such as ethylene diamine, 1,2-propylene diamine, 2,2-dimethyl-1,3-propane diamine, 1,3-pentane diamine, 2-methyl-1,5-pentane diamine, 2-butyl-2-ethyl-1,5-pentane diamine, 1,6-hexane diamine, 2,2,4-trimethyl hexane diamine, 2,4,4-trimethyl hexane diamine, 1,8-octane diamine, 1,9-nonane diamine, 1,10-decane diamine or the like; an alicyclic diamine such as 1-amino-3-aminomethyl-3,5,5-trimethyl cyclohexane, 4,4'-dicyclohexyl methane diamine, isopropylidene cyclohexyl-4,4'-diamine, 1,4-diaminocyclohexane, 1,3-bisaminomethyl cyclohexane or the like; or the like may be exemplified. Among the examples, ethylene diamine, propylene diamine, 1,3-pentane diamine and 2-methyl-1,5-pentane diamine are preferable.

Although an amount of the chain extender used during the urethanization reaction is not particularly limited, a ratio of a molar number of the isocyanate moiety derived from the organic polyisocyanate to the total molar number of the active hydrogen in the polyol composition and the active hydrogen derived from the chain extender (NCO Index) is preferably set to 0.2 to 10, more preferably set to 0.5 to 1.25, and particularly preferably set to 0.9 to 1.1.

The urethanization reaction may be conducted by raising the temperature of reaction raw materials until the viscosity thereof allows the reaction raw materials to be sufficiently stirred. The specific temperature, when the reaction is conducted, is preferably within a range from room temperature to 200° C., and more preferably 50 to 100° C. In the case where the temperature at the reaction is too low, the reaction tends to slowly proceed, and thereby the time period required for the preparation tends to be extended. In the case where the temperature at the reaction is too high, a side reaction tends to occur, or the usable time tends to shorten, and thereby a molding treatment tends to become difficult. The urethanization reaction may be conducted without using any solvents or in a solvent. The solvent is not particularly limited as long as it is inactive in the reaction. For instance, toluene, ethyl acetate, butyl acetate, methylethylketone, dimethylformamide, tetrahydrofuran or the like may be exemplified.

A catalyst may be used to the polyurethanization reaction. As the catalyst, for instance, tertiary amines such as dimethylethanolamine, triethylenediamine, tetramethylpropanediamine, tetramethylhexamethylenediamine, dimethylcyclohexylamine or the like; metallic catalysts such as, stannous octoate, potassium octoate, dibutyltin dilaurate or the like; or the like may be exemplified. An amount of the catalyst to be used is preferably 1 to 1000 ppm, and more preferably 5 to 500 ppm, with reference to the total amount of the organic isocyanate, the chain extender and the polyol. When the amount of the catalyst to be used is too little, the reaction slowly proceeds, and the time period required for the preparation is elongated. When the amount of the catalyst to be used is too much, there is a case where heat generation is significant, the control of the reaction is difficult, and gel products are generated, or a colored polyurethane is generated.

Other additive agents may be suitably added to the polyurethane according to the present invention, provided that effects of the present invention are not deteriorated. As other additive agents, a flame retardant, a deterioration inhibitor, a plasticizer, or the like may be exemplified. The polyurethane of the present invention is extremely advantageously useful for spandexes, polyurethane elastomers, urethane foams, adhesive agents, synthetic leathers, paints, sealing agents or the like.

EXAMPLES

The present invention is described below in further detail using a series of examples. The present invention is in no way limited by these examples, and can, of course, be practiced with modification as appropriate within a range that may be adaptable to the purposes of the present invention, and those are all encompassed in the technical scope of the present invention.

In Examples and Comparative Examples, the physical properties were measured by the following methods.
[Phosphorus Element Content]
0.25 g of a standard solution (phosphorus standard solution for atomic absorption spectrometry, 1000 mg/L, manufactured by Kanto Chemical Co., Inc.) or 0.25 g of sample was collected in a sample container made of polypropylene, and then adjusted to 10 g using N,N-dimethyl acetamide/acetic acid isoamyl=1/1 (volume ratio, both manufactured by Wako Pure Chemical Industries, Ltd.). Inductively coupled plasma emission spectrum (ICP-AES) (manufactured by Thermo Fisher Scientific K.K., IRIS Interpid II XDLDUO) was measured and the content was determined at the wavelength of 213.618 (nm).
[Mass Ratio of Polybutadiene Chain/Polycaprolactone Chain]
0.03 g of sample was adjusted to 1 g of sample using chloroform-d, and then 1H-NMR (manufactured by JEOL Ltd., ECP500) was measured to determine the mass ratio of polybutadiene chain/polycaprolactone chain using the integration ratio of the peaks characteristic of each polymer chain.
[Molecular Weight]
The molecular weight was determined based on the measurement by a gel permeation chromatography by conversion to a standard polystyrene molecular weight.

[NCO Content]
Approximately 3 g of the urethanization reaction liquid was put into a conical flask equipped with a stopper in which dry air was flowed, to which 20 ml of toluene and 20 ml of a dibutylamine/toluene solution were added, and then the mixture was stirred for 15 minutes. Thereafter, 100 ml of 2-propanol was added to the resulting mixture and a few drops of a bromophenol blue indicator were added thereto, and titrimetric analysis was conducted using 0.5M of hydrochloric acid to determine the quantity of isocyanate (NCO) groups.
<Hardness>
The hardness A and hardness D were measured by laminating 6 sheets, each having a thickness of 2 mm, and using A type and D type of an durometer.
<Tensile Strength, Breaking Elongation, Modulus>
Modulus at 100% elongation (M100), modulus at 200% elongation (M200), modulus at 300% elongation (M300), tensile strength (TB, stress at breaking), and breaking elongation (EB) were measured in accordance with JIS K 7312 by preparing a No. 5 dumbbell test piece and using a testing machine (manufactured by Shimadzu Corporation under the trade name of AUTOGRAPH AGS-J (51N)).
<Water Absorption Rate>
Each test piece having a size of 50 mm×50 mm×2 mm thickness was prepared. The mass $W_0$ of the test piece was measured. The test piece was immersed in water at 23° C. for 24 hours. The test piece was pulled up from the water to wipe off water from the surface thereof, and the mass $W_1$ thereof was measured. The ratio (water absorption ratio) of the increased mass $W_1$-$W_0$ during the immersion with reference to the mass $W_0$ before the immersion was calculated.

Example 1

100 g of polybutadiene having hydroxyethyl groups at both terminals thereof (NISSO-PB G-1000, manufactured by Nippon Soda Co., Ltd., molar ratio of 1, 2-structure/1, 4-structure=90.0/10.0, number average molecular weight (Mn)=2700, hydroxyl value=72.5 (KOH mg/g)) and 140 g of ε-caprolactone (manufactured by Wako Pure Chemical Industries, Ltd.) were put into a separable flask, and then heated at 60° C. to obtain a uniform solution under a nitrogen atmosphere. 0.07 g (0.002 mol by part with respect to 1 mol by part of the active hydrogen in polybutadiene) of phosphoric acid diphenyl (manufactured by Tokyo Chemical Industry Co., Ltd.) was added thereto, heated at 100° C., and then stirred at 100° C. for 7 hours. Thereafter, the resultant was cooled to 80° C., and taken out from the flask to obtain a composition including polyester polyol A. In polyester polyol A, the number-average molecular weight (Mn) thereof was 6220, the weight-average molecular weight (Mw) thereof was 8100, the molecular weight distribution (Mw/Mn) thereof was 1.302, the mass ratio of polybutadiene chain/polycaprolactone chain thereof was 40.5/59.5. The amount of the phosphorus element contained in polyester polyol A was 35 ppm.

135.1 g of a composition including polyester polyol A was put into a separable flask and the pressure therein was reduced. Thereafter, stirring was conducted at 100° C. to remove the moisture content from the system. Then, nitrogen gas was introduced into the system to obtain an ordinary pressure, and the temperature was decreased to 80° C. 13.1 g of tolylenediisocyanate (COSMONATE T-100, manufactured by Mitsui Chemicals, Inc.) (R ratio=2.1) was added therein, and stirred at 80° C. for 1 hour. The reaction was progressed until the NCO content was within a range of its theoretical value (=2.2%)±0.5% to obtain urethane prepolymer A.

145.2 g of urethane prepolymer A was defoamed by stirring the mixture under reduced pressure at 80° C. for 30 minutes. Thereafter nitrogen gas was introduced into the system to return the pressure therein to ordinary pressure. 3.3 g of 1, 4-butanediol (NCO index=1.05) was added to the resultant followed by stirring for 3 minutes. The obtained urethanization reaction solution was then immediately poured onto a glass plate pretreated with a release agent to obtain a thickness of 2 mm. The glass plate had silicon rubber walls having a thickness of 2 mm at edges of the glass plate. The resultant was heated at 100° C. for 2 hours, and then reacted at 110° C. for 15 hours. The obtained sheet with a thickness of 2 mm was removed from the glass plate, and then was subjected to annealing treatment at 100° C. for 14 hours to obtain polyurethane A. The appearance of polyurethane A was light yellow and transparent. The evaluation results of polyurethane A are shown in Table 1.

Example 2

A composition including polyester polyol B was obtained in the same manner as that of Example 1, except that phosphoric acid diphenyl was used in an amount of 0.14 g (0.004 parts by mol with respect to 1 pat by mol of active hydrogen in polybutadiene). In polyester polyol B, the number-average molecular weight (Mn) thereof was 6620, the weight-average molecular weight (Mw) thereof was 8890, the molecular weight distribution (Mw/Mn) thereof was 1.344, the mass ratio of polybutadiene chain/polycaprolactone chain thereof was 40.0/60.0. In addition, the amount of the phosphorus element contained in polyester polyol B was 70 ppm.

Polyurethane B was obtained in the same manner as that of Example 1, except that a composition including polyester polyol B was used instead of the composition including polyester polyol A. The appearance of polyurethane B was brown and opaque. The evaluation results of polyurethane B are shown in Table 1.

Example 3

A composition including polyester polyol C was obtained in the same manner as that of Example 1, except that polybutadiene (NISSO-PB G-1000) was used in an amount of 200 g, ε-caprolactone was used in an amount of 281.7 g and phosphoric acid diphenyl was used in an amount of 2.82 g (0.04 parts by mol with respect to 1 part by mol of the active hydrogen in polybutadiene). In polyester polyol C, the number-average molecular weight (Mn) thereof was 6425, the weight-average molecular weight (Mw) thereof was 8475, the molecular weight distribution (Mw/Mn) thereof was 1.319, the mass ratio of polybutadiene chain/polycaprolactone chain thereof was 39.7/60.3. In addition, the amount of the phosphorus element contained in polyester polyol C was 730 ppm.

Polyurethane C was obtained in the same manner as that of Example 1, except that a composition including polyester polyol C was used instead of the composition including polyester polyol A. The appearance of polyurethane B was brown and opaque. The evaluation results of polyurethane C are shown in Table 1.

Comparative Example 1

378.4 g of toluene, 94.6 g of ε-caprolactone, 70.0 g of polybutadiene having hydroxyethyl groups at the both terminals thereof (NISSO-PB G-1000, manufactured by Nippon Soda Co., Ltd., molar ratio of 1, 2-structure/1, 4-structure=90.2/9.8, number-average molecular weight (Mn)= 2700, hydroxyl value=70.7 (KOH mg/g)) and 23.7 g of phosphoric acid diphenyl (1 part by mol with respect to 1 part by mol of the active hydrogen in polybutadiene) were put into a separable flask continuously. After completion of the addition, the resulting mixture was stirred at room temperature for 24 hours. The volatile components were distilled off from the obtained urethanization reaction solution under reduced pressure using an evaporator to obtain polymer polyol D.

In polyester polyol D, the number-average molecular weight (Mn) thereof was 4640, the weight-average molecular weight (Mw) thereof was 8080, the molecular weight distribution (Mw/Mn) thereof was 1.743, the mass ratio of polybutadiene chain/polycaprolactone chain thereof was 44.6/55.4. In addition, the amount of the phosphorus element contained in polyester polyol A was 15000 ppm.

Although an attempt was made to obtain polyurethane D in the same manner as that of Example 1, except that a composition including polyester polyol D was used instead of the composition including polyester polyol A, a brown colored transparent viscous matter was generated and polyurethane was not obtained.

TABLE 1

| | Example 1 | Example 2 | Example 3 | Comparative Example 1 |
|---|---|---|---|---|
| Amount of Phosphorus compound [DPP]/[OH] | 0.002 | 0.004 | 0.04 | 1 |
| Phosphorus content (ppm) | 35 | 70 | 730 | 15000 |
| Hardness A | 48 | 40 | 31 | — |
| Hardness D | 9 | 5 | 4 | — |
| M100 | 0.7 | 0.5 | 0.2 | — |
| M200 | 0.8 | 0.6 | 0.2 | — |
| M300 | 0.8 | 0.6 | 0.2 | — |
| TB | 2.5 | 2.5 | 0.4 | — |
| EB (%) | 600 | 766 | 1104 | — |
| Water Absorption Rate (%) | 0.48 | 0.34 | 0.34 | — |

INDUSTRIAL APPLICABILITY

According to the polyol composition of the present invention, excessive side reaction may be suppressed during the urethanization using an isocyanate or the like. Furthermore, according to the method for producing a polyol composition, the polyol composition of the present invention may be produced without performing a polymerization catalyst-removing operation. Furthermore, according to the polyol composition of the present invention, a polyurethane excellent in storage stability and mechanical properties may be produced. Therefore, the present invention is industrially useful.

The invention claimed is:
1. A method for producing a polyol composition, comprising:
   reacting a compound having an active hydrogen with a compound having at least one selected from the group consisting of a carboxyl group, ester group and acid halide group in the presence of 0.0001-0.05 parts by mol of a phosphorus compound with respect to 1 part by mol of the active hydrogen without using a metal-based polymerization catalyst, wherein:

the compound having an active hydrogen is a compound represented by formula (3),

TO-X¹—OH　　(3)

in formula (3), $X^1$ represents a polymer chain including a repeating unit derived from a conjugated diene, and T represents a hydrogen atom or an organic group substitutable with a hydrogen atom, and the phosphorus compound is a compound represented by formula (2),

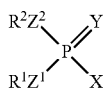　　(2)

in formula (2), X represents a hydroxyl group or a mercapto group, Y represents an oxygen atom or a sulfur atom, $R^1$ and $R^2$ each independently represents a substituted or unsubstituted C1-20 hydrocarbon group, $R^1$ and $R^2$ may bond directly or via an atom or a functional group having two or more bonding hands to form a ring together with $Z^1$, $Z^2$ and P, and $Z^1$ and $Z^2$ each independently represents an oxygen atom or a substituted nitrogen atom.

2. The method for producing a polyol composition according to claim 1, wherein
the conjugated diene is butadiene.

3. The method for producing a polyol composition according to claim 1, wherein
the compound having at least one selected from the group consisting of a carboxyl group, ester group and acid halide group is a cyclic ester compound.

4. The method for producing a polyol composition according to claim 3, wherein
the cyclic ester compound is a compound represented by formula (1),

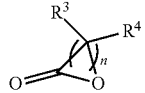　　(1)

in formula (1), $R^3$ and $R^4$ each independently represents a hydrogen atom or an alkyl group, n represents an integer of 2 to 7, and $R^3$s or $R^4$s may be the same or different from each other.

5. The method for producing a polyol composition according to claim 3, wherein
the cyclic ester compound is at least one selected from the group consisting of ε-caprolactone, γ-butyrolactone, and δ-valerolactone.

6. A polyol composition obtained by the method for producing a polyol composition according to claim 1, comprising a polyol having a polyester chain, wherein the polyol composition substantially contains no metal-based polymerization catalyst, and an amount of phosphorus element derived from a polymerization catalyst is 1 to 1000 ppm.

7. The polyol composition according to claim 6, wherein the polyol further has a polyconjugated diene chain.

8. The polyol composition according to claim 7, wherein the polyconjugated diene chain is a polybutadiene.

9. A urethane prepolymer obtained by reacting the polyol composition defined in claim 6 with an organic polyisocyanate.

10. A polyurethane obtained by reacting the polyol composition defined in claim 6 with an organic polyisocyanate.

* * * * *